United States Patent [19]

Cuba

[11] Patent Number: 5,026,968
[45] Date of Patent: Jun. 25, 1991

[54] WELDING ELECTRODE TIP CRACKING APPARATUS AND METHOD

[75] Inventor: Gary W. Cuba, Hopkins, S.C.

[73] Assignee: Westinghouse Electric Corp., Pittsburgh, Pa.

[21] Appl. No.: 517,773

[22] Filed: May 2, 1990

[51] Int. Cl.$^5$ ............................................. B23K 9/26
[52] U.S. Cl. .............................. 219/145.21; 219/75; 219/136
[58] Field of Search ................. 219/145.21, 136, 75, 219/137 R; 72/389, 454

[56] References Cited

U.S. PATENT DOCUMENTS

| | | | |
|---|---|---|---|
| 1,273,265 | 7/1918 | Morgan | 72/454 |
| 1,288,648 | 12/1918 | Morgan | 72/454 |
| 2,541,302 | 10/1943 | Peters | 72/446 |
| 2,917,956 | 12/1959 | Merion | 72/454 |
| 4,471,208 | 9/1984 | Edmonds | 219/145.29 |
| 4,489,578 | 12/1984 | Nagai et al. | 72/389 |

*Primary Examiner*—Clifford C. Shaw

[57] ABSTRACT

A welding electrode tip cracking apparatus includes a main housing having spaced front and rear walls defining a cavity therebetween. The front wall has an entry passage for receiving an electrode therethrough having a tip end in which a cruciform-shaped crack is to be formed. A gauge member is adjustably mounted to the rear wall and has a stop element spaced from and disposed in alignment with the front wall entry passage. The stop element is engageable by the electrode tip end to block further movement of the electrode tip toward the rear wall. A die assembly has a support frame fitted within the cavity between the main housing front and rear walls and defining a guide channel. A pair of upper and lower crimping dies are disposed within the support frame guide channel. An elongated thrust shaft is rotatably mounted to the support frame and coupled to the dies such that rotation of the shaft causes movement of the dies toward and away from each other along the guide channel and thereby toward and away from the electrode for crimping the electrode therebetween which, in turn, causes propagation of a split in the electrode tip. A travel stop element is disposed between the dies for limiting how close the dies can be moved toward each other so as to prevent over-crimping of the electrode by the dies.

20 Claims, 4 Drawing Sheets

WELDING ELECTRODE TIP CRACKING APPARATUS AND METHOD

BACKGROUND OF THE INVENTION

1. Field of the Invention

The present invention relates generally to an electrode used in a tungsten inert gas (TIG) welding operation, and more particularly, to a cracking apparatus and method for producing an improved cruciform-shaped crack in a tip of the electrode for enhancing electrode life and arc-starting capability.

2. Description of the Prior Art

Various tip configurations of thoriated tungsten electrodes have been used in the past for TIG girth welding of nuclear fuel rods. In recent years, it has been found that a "flat split" end configuration on a welding electrode tip, specifically one having a 0.040 inch diameter, provides many benefits, especially in longer electrode life and more reliable arc starts. The ideal configuration of the split or crack is a cruciform shape, centrally and symmetrically located on the flat end face of the electrode tip. The preferred location of crack origin (the length of the split) is 0.06 inch from the end face. Operating experience has shown that both the symmetry and length of cracks are crucial to successful performance of the electrode in service. One example of a cruciform slot in a welding electrode tip is illustrated in U.S. Pat. No. 4,471,208 to Edmonds.

Heretofore, the ideal crack configuration has not been easily achieved owing to the tooling used to produce it. Prior to the present invention, electrode tips have been configured by hand, by an operator using a pair of ordinary hand cutters or "dykes". The success of this technique is highly dependent on the level of operator skill in terms of dexterity, vision and kinesthetic "feel". Even the most highly skilled operators can not produce crack configurations which are consistent from one electrode tip to the next. There is no way of accurately controlling crack length or the pressure applied to the cracking cutters. Ordinarily, many cracking attempts had to be made before an adequate configuration was obtained, with corresponding regrinding (reflattening) and wastage of electrode length between each attempt In many cases, completed electrodes transferred to production departments have unsymmetrical and irregular crack configurations which do not work well in service Consequently, a need exists for a different approach to producing a crack in an electrode tip that will more nearly and consistently resemble the ideal cruciform crack configuration.

SUMMARY OF THE INVENTION

The present invention provides a welding electrode tip cracking apparatus and method designed to satisfy the aforementioned needs. The cracking apparatus and method of the present invention overcomes the above-noted problems with use of hand-actuated cutters. The cracking apparatus and method produce a uniform and consistently-repeatable cruciform-shaped crack configuration in the electrode tip which enhances electrode life and arc-starting capability, unlike the previous techniques which were not well-controlled and did not provide high quality results.

Accordingly, the present invention is directed to a welding electrode tip cracking apparatus which comprises: (a) a main housing having a pair of spaced walls defining a cavity therebetween, one of the walls having an entry passage for receiving an elongated electrode therethrough having a tip in which a cruciform-shaped crack is to be formed; (b) a gauge member adjustably mounted to the other wall and having a stop element thereon spaced from and disposed in alignment with the entry passage, the stop element being engagable by an end of the electrode tip so as to block further movement of the electrode tip toward the other wall; and (c) a die assembly which includes (i) a support frame fitted within the cavity between the spaced main housing walls and defining a guide channel, (ii) a pair of spaced crimping dies disposed within the guide channel of the support frame, and (iii) an elongated thrust shaft rotatably mounted to the support frame and coupled to the spaced crimping dies such that rotation of the shaft causes movement of the crimping dies toward and away from each other along the guide channel and thereby toward and away from the electrode for crimping the electrode therebetween which, in turn, causes propagation of a split in the electrode tip. Also, a travel stop element is disposed between the spaced crimping dies for limiting how close the dies can be moved toward each other so as to prevent overcrimping of the electrode tip by the dies.

The present invention also is directed to a welding electrode tip cracking method which comprises the steps of: (a) inserting a tip of an elongated electrode between and through a first predetermined distance past a pair of spaced crimping dies; (b) moving the crimping dies toward one another and into engagement with the electrode at a first location thereon spaced a known distance from an end of the electrode tip; (c) crimping the electrode between the crimping dies at the first location so as to cause propagation of a first split in the electrode tip from the first location to the tip end; and (d) moving the crimping dies away from one another so as to release engagement with the electrode. The method further comprises the steps of: (e) rotating the electrode about its longitudinal axis through an predetermined angular displacement; (f) moving the crimping dies toward one another and into engagement with the electrode at a second location thereon angularly displaced about the electrode from the first location; and (g) crimping the electrode between the crimping dies so as to cause propagation of a second split in the electrode tip from the second location to the tip end which intersects and is angularly displaced from the first split; and (h) moving the crimping dies away from one another so as to release engagement with the electrode.

Preferably, the first and second splits extend in an orthogonal intersecting relation with respect to one another and define a cruciform-shaped crack in the electrode tip wherein the respective origins of the splits are offset axially from one another. Also, the tip of the electrode is inserted between and through a second predetermined distance past the spaced crimping dies which is different than the first predetermined distance such that crimping of the electrode and thereby the origins of the splits made by the dies occurs at two different locations along the electrode.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

DESCRIPTION OF THE PREFERRED EMBODIMENTS

Figure 1:
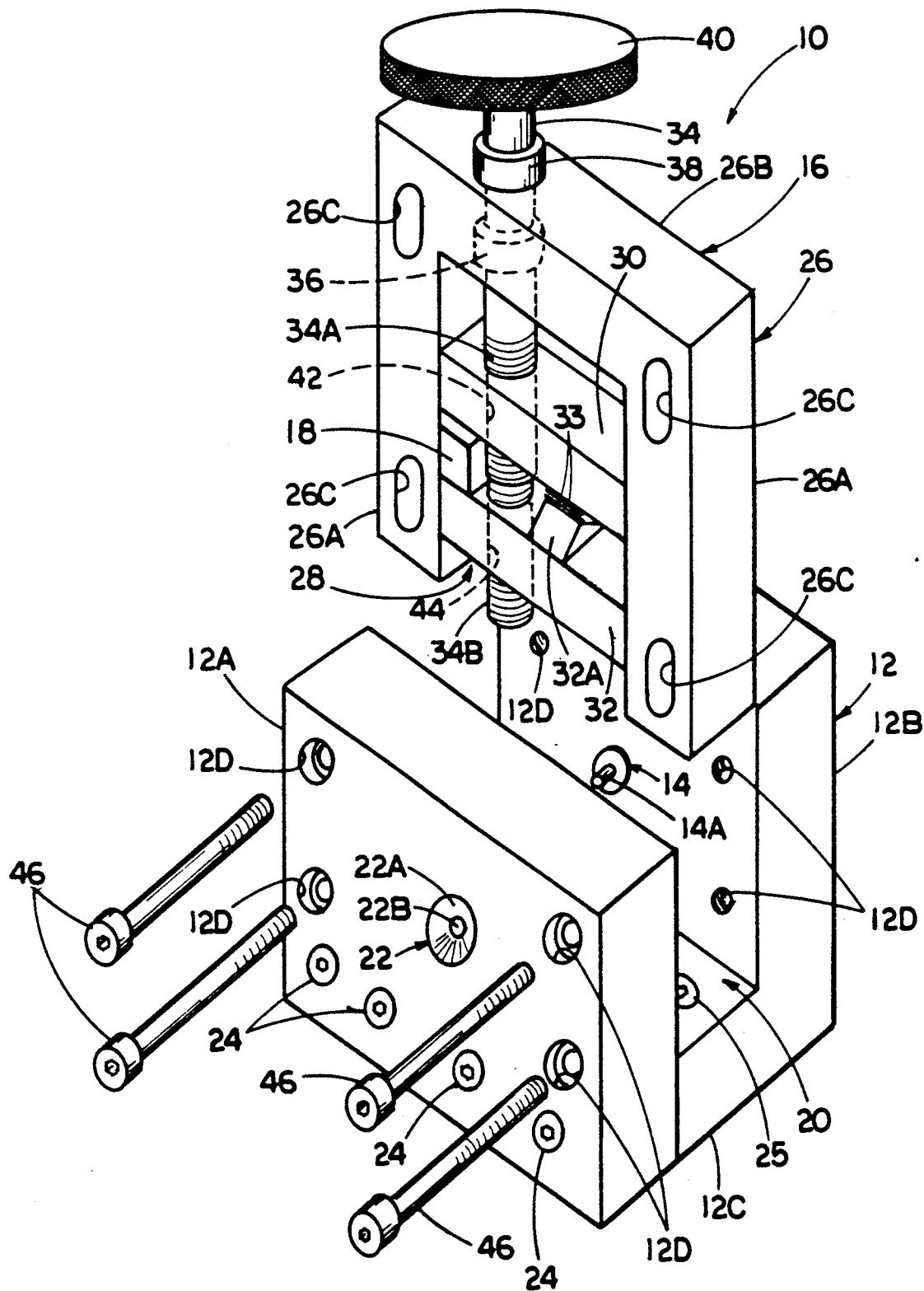
FIG. 1 is an exploded perspective view, with a portion broken away for purpose of clarity, of a welding electrode tip cracking apparatus of the present invention.
Figure 2:
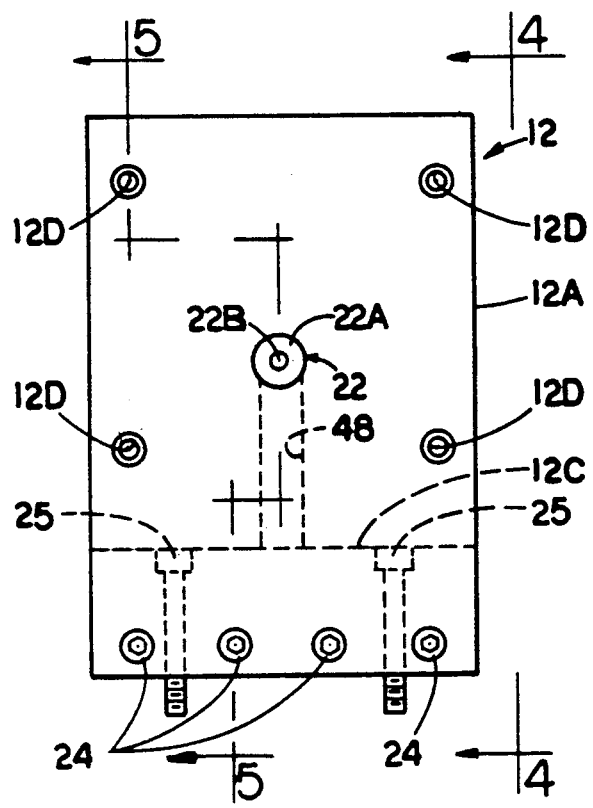
FIG. 2 is a front elevational view of a main housing of the cracking apparatus of FIG. 1.
Figure 3:
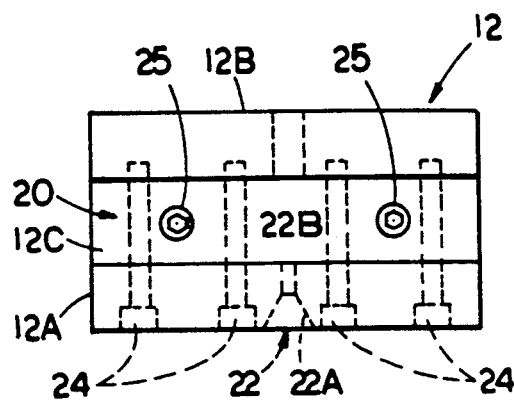
FIG. 3 is a top plan view of the main housing as seen along line 3—3 of FIG. 2.
Figure 4:
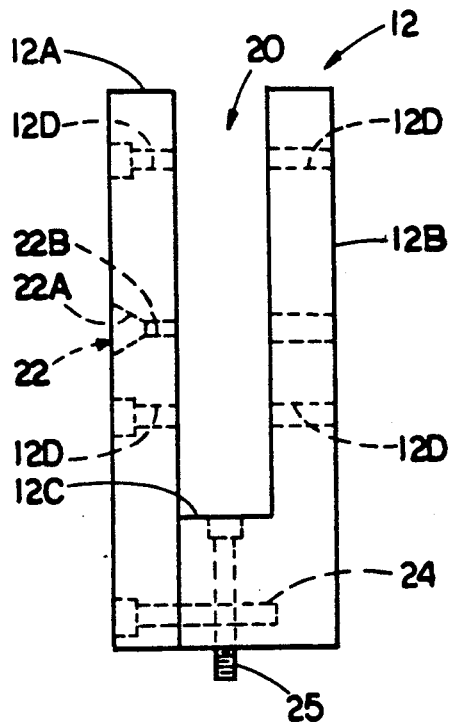
FIG. 4 is a side elevational view of the main housing as seen along line 4—4 of FIG. 2.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Referring now to the drawings, and particularly to FIG. 1, there is shown a welding electrode tip cracking apparatus, generally designated by the numeral 10. In its basic components, the electrode tip cracking apparatus 10 includes a main housing 12, a gauge member 14, a die assembly 16, and a die travel stop element 18.

Referring to FIGS. 1–5, the main housing 12 of the cracking apparatus 10 has spaced apart front and rear walls 12A, 12B defining a cavity 20 of generally rectangular configuration therebetween. The front wall 12A has an entry passage 22 formed therethrough. The entry passage 22 is sized to receive therethrough an elongated thin rod-shaped welding electrode A having a tip B. The entry passage 22 has a forward flared portion 22A which merges into a rearward cylindrical portion 22B whose diameter is only slightly larger than that of the electrode A. The main housing 12 also has a bottom wall 12C integrally connected with the rear wall 12B. Fasteners 24 are provided for connecting the front wall 12A to the front face of the bottom wall 12C of the main housing 12. Fasteners 25 are also provided for attaching the bottom wall 12C to a suitable work bench (not shown).

Figure 5:
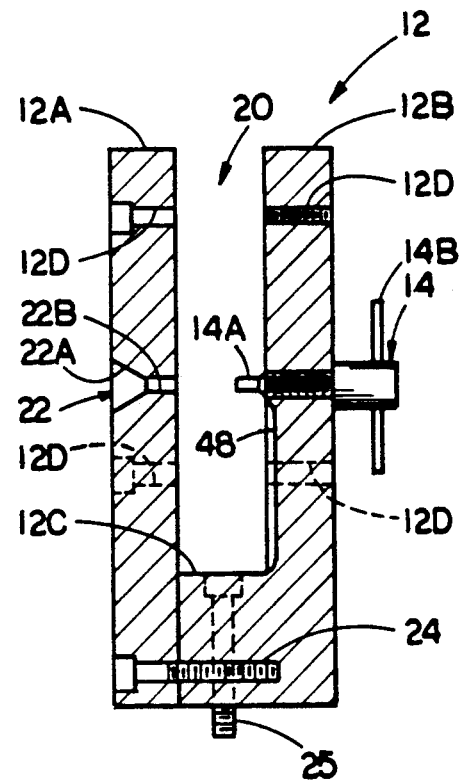
FIG. 5 is a sectional view of the main housing taken along line 5—5 of FIG. 2, illustrating also a gauge member having a stop element threadably mounted to a rear wall of the main housing in alignment with an entry passage in a front wall of the housing.
Figure 6:
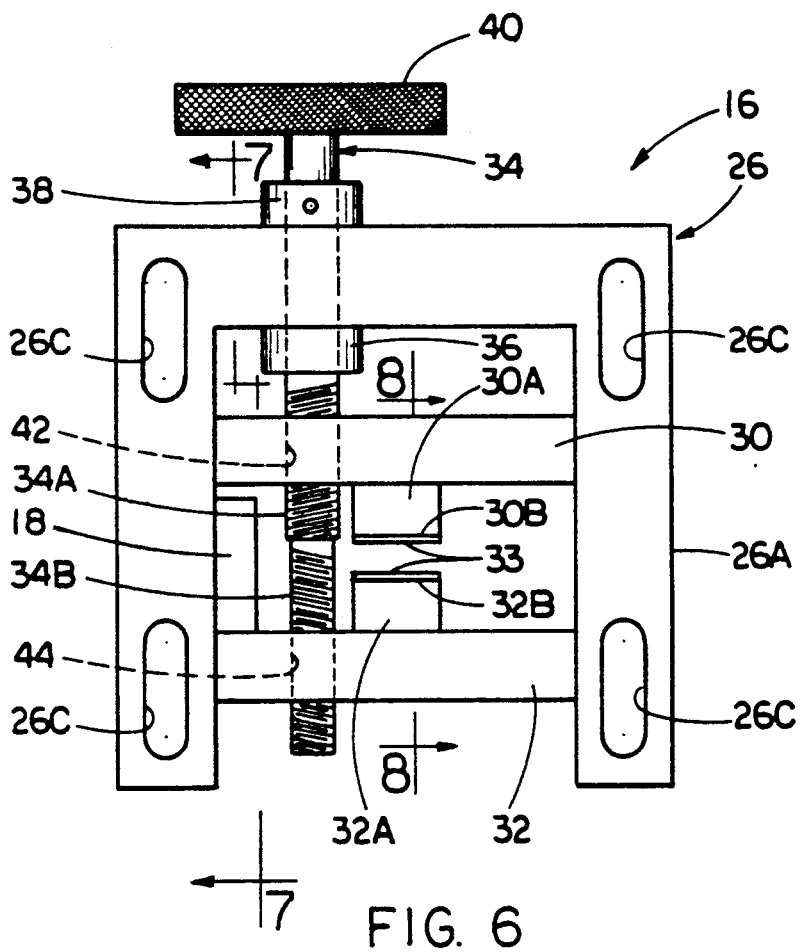
FIG. 6 is a front elevational view of a die assembly of the cracking apparatus of FIG. 1.
Figure 7:
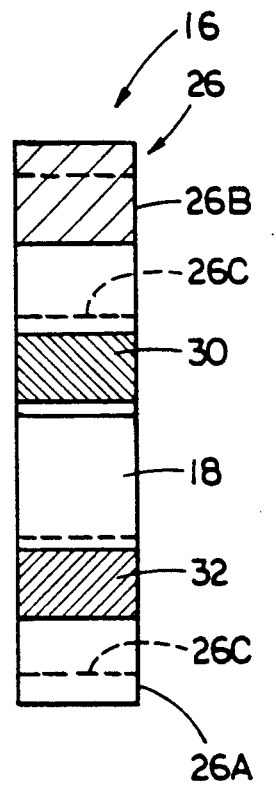
FIG. 7 is a sectional view of the die assembly taken along line 7—7 of FIG. 6.
Figure 8:
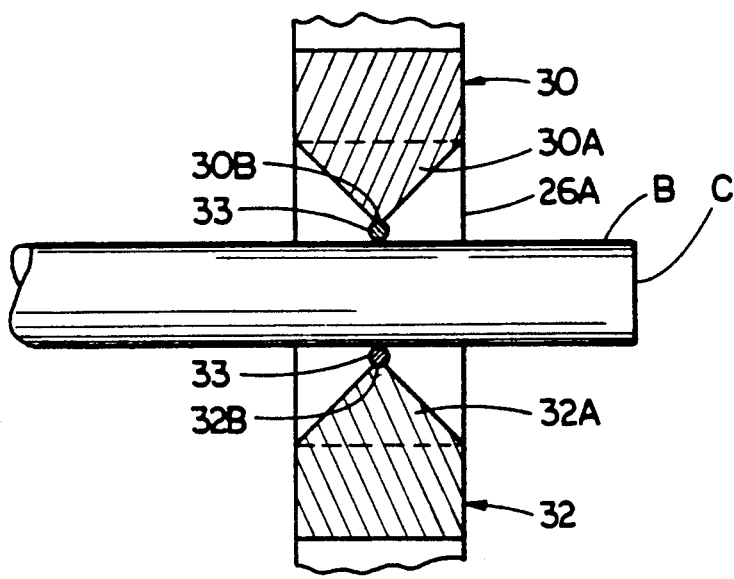
FIG. 8 is an enlarged fragmentary sectional view of a pair of upper and lower crimping dies of the die assembly taken along line 8—8 of FIG. 6 with a tip of a welding electrode disposed between the dies.

Referring to FIG. 5, the gauge member 14 of the cracking apparatus 10 takes the form of a setscrew 14 threadably adjustably mounted to the rear wall 12B of the housing 12. The setscrew gauge member 14 has a stop element 14A in the form of a small diameter protruding tip 14A on its forward end and a transverse shaft 14B on its rear end for use in manually turning the gauge member 14. The stop element 14A is spaced from and disposed in alignment with the entry passage 22 of the main housing front wall 12A. The electrode A can be inserted through the entry passage 22 rearwardly toward the rear wall 12B until an end C of the electrode tip B engages the stop element 14A of the gauge member 14. The stop element 14A thus blocks further movement of the electrode tip B toward the rear wall 12B.

Referring to FIGS. 1 and 6–8, the die assembly 16 of the cracking apparatus 10 has a support frame 26 preferably of horseshoe configuration being constructed of vertical side members 26A and a transverse horizontal top member 26B which define a guide channel 28 therebetween. The support frame 26 fits snugly within the cavity 20 between the front and rear walls 12A, 12B of the main housing 12. The die assembly 16 also includes a pair of upper and lower crimping dies 30, 32 disposed within the guide channel 28 of the support frame 26, and an elongated thrust shaft 34. The dies 30, 32 have converging tapered portions 30A, 32A each defining generally parallel extending horizontal edges 30B, 32B which are aligned with one another. Preferably, a small pin 33 (for example, of about 0.060 inch diameter) composed of hard material, such as carbide, is attached, such as by brazing, onto each die edge 30B, 32B, eliminating generation of damage-inducing notches in the surface of the electrode A in producing a crack D in the tip B thereof and extending the life of the edges.

The thrust shaft 34 of the die assembly 16 is rotatably mounted to the top member 26B of the support frame 26 by a pair of axially spaced fixed and removable collars 36, 38 thereon. The shaft 34 also is coupled to the upper and lower crimping dies 30, 32 and rotatable by turning a knob 40 on the upper end of the shaft 34. The rotatably-mounted thrust shaft 34 has upper lefthand and lower righthand externally threaded sections 34A, 34B axially displaced from one another. The upper and lower crimping dies 30, 32 have respective lefthand and righthand internally threaded bores 42, 44 which receive the corresponding externally threaded sections 34A, 34B of the shaft 34. Thus, when the knob 40 is turned, rotation of the shaft 34 in one sense causes movement of the crimping dies 30, 32 away from each other, whereas turning of the knob 40 and rotation of the shaft 34 in an opposite sense causes movement of the crimping dies 30, 32 toward one another. In either direction, the dies 30, 32 move along the guide channel 28 although they are not coupled to the support frame 26.

It should be pointed out that for assembly purposes, in the preferred embodiment, the lower threaded section 34B of the thrust shaft 34 is sized so that the major diameter of its male threads is less than the minor diameter of the internal threads 42 of the upper die 30. Such size requirement becomes obvious for assembly of the die 30 onto the thrust shaft 34. Without such threading approach, the upper die 30 cannot be assembled in its proper position on the upper threads 34A because it would not clear the lower threads 34B. Also, while the respective diameters of the threaded sections 34A, 34B of shaft 34 must be different for proper assembly, the pitch of these threads (threaded sections 34A, 34B) should be identical so that each die 30, 32 moves axially the same amount for equal thrust shaft rotation.

Such movement of the upper and lower crimping dies 30, 32 toward and away from each other along the guide channel also moves them toward and away from the electrode A inserted through the front wall entry passage 22 and engaged with the stop element tip 14A of the gauge member 14. The side members 26A of the support frame 26 have spaced slots 26C formed therethrough which are alignable with holes 12D in the front and rear walls 12A, 12B and receive fasteners 46 for attaching the support frame 26 between the front and rear walls 12A, 12B with the crimping dies 30, 32 in the desired position relative to the electrode A extending through the space between the dies.

The die travel stop element 18 of the cracking apparatus 10 is disposed on one end of the lower die 32 and between the upper and lower crimping dies 30, 32. The stop element 18 limits how close the crimping dies 30, 32 can be moved toward each other so as to prevent over-crimping of the electrode A by the dies.

Figure 9:
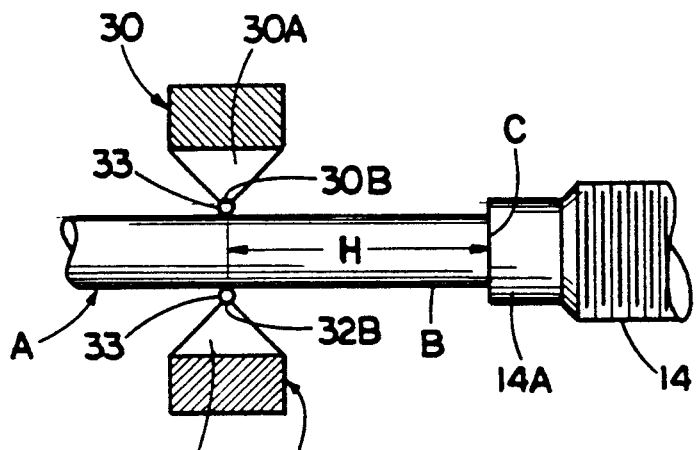
FIG. 9 is a schematic representation of a first positional relationship between the gauge element and the upper and lower dies of the cracking apparatus for forming a first split of the cruciform-shaped crack in the electrode tip.
Figure 10:
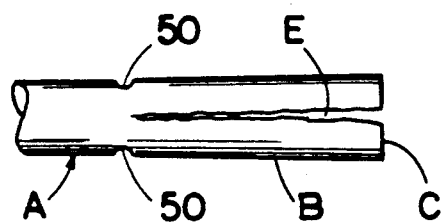
FIG. 10 is a schematic representation of the first split of the cruciform-shaped crack in the electrode tip.

Referring to FIGS. 9-13, in accordance with the method of the present invention, the electrode tip cracking operation is performed by the cracking apparatus 10 as follows. First, the tip B of the elongated electrode A is inserted between and past the edges 30B, 32B of the upper and lower spaced crimping dies 30, 32 until further movement of the electrode tip end C is blocked by engagement with the stop end 14A of the gauge member 14, as seen in FIG. 9. Second, the crimping dies 30, 32 are moved toward one another by selected rotation of the thrust shaft 34 to bring the carbide pins 33 on the die edges 30B, 32B into engagement with opposite sides of the electrode A at a first location 50 thereon, as seen in FIG. 9. Third, continued movement of the dies 30, 32 toward one another until they bottom against the die travel stop element 18 causes sufficient crimping of the electrode A between the crimping dies 30, 32 at the first location 50 to cause propagation of a first split E in the electrode tip B extending from the first location 50 to the tip end C, as seen in FIG. 10.

Figure 11:
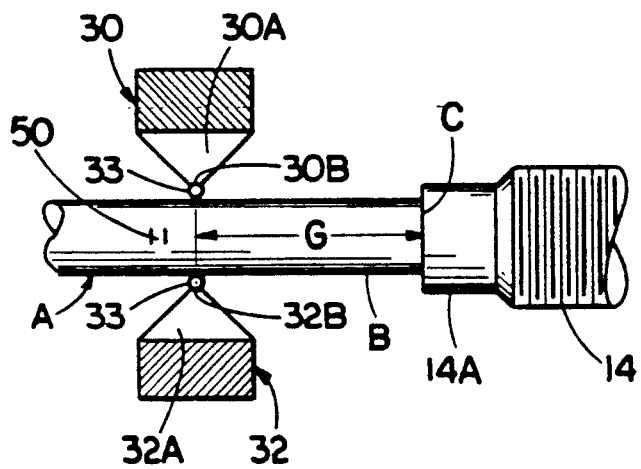
FIG. 11 is a schematic representation of a second positional relationship between the gauge element and the upper and lower dies of the cracking apparatus for forming a second split of the cruciform-shaped crack in the electrode tip extending in an orthogonal intersecting relationship to and originating at a location offset axially from the first split.
Figure 12:
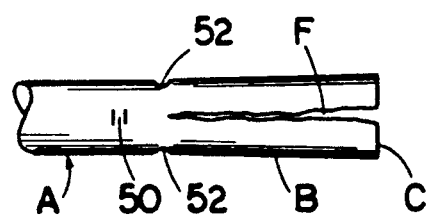
FIG. 12 is a schematic representation of the second split of the cruciform-shaped crack in the electrode tip.
Figure 13:
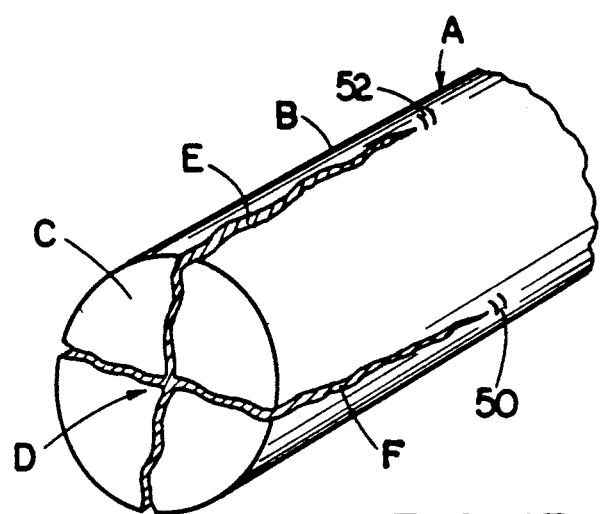
FIG. 13 is an enlarged fragmentary perspective view of the electrode tip depicting the cruciform-shaped crack formed the first and second intersecting orthogonal splits formed therein.

Fourth, the crimping dies 30, 32 are now moved away from one another by reverse rotation of the thrust shaft 34 so as to release engagement with the electrode A. Fifth, the electrode A is rotated about its longitudinal axis through an predetermined angular displacement, such as ninety degrees, to the position shown in FIG. 11. Sixth, the crimping dies 30, 32 are again moved toward one another by selected rotation of the thrust shaft 34 to bring the carbide pins 33 back into engagement with opposite sides of the electrode A but now at a second location 52 thereon, as seen in FIG. 11, being angularly displaced ninety degrees from the first location 50 seen in FIG. 9. Seventh, the electrode A is sufficiently crimped between the crimping dies 30, 32 to cause propagation of a second split F in the electrode tip B which extends from the second location 52 to the tip end C and intersects with and is angularly displaced from the first split E, as seen in FIGS. 12 and 13. And, finally, the crimping dies 30, 32 are moved away from one another by reverse rotation of the thrust shaft 34 so as to release engagement with the electrode A which then can be withdrawn from the cracking apparatus 10.

As seen in FIG. 13, the first and second splits E, F extend in an orthogonal intersecting relation with respect to one another and define the crack D now having a cruciform shape in the electrode tip B where the respective origins of the splits E, F are offset axially from one another. In formation of the second split F in FIG. 11, the tip end C of the electrode A is inserted through a second predetermined distance G past the spaced crimping dies 30, 32 which is less than the first predetermined distance H past the dies in FIG. 9 in the formation of the first split E. Thus, crimping of the electrode A and the origin of the splits E, F by the dies 30, 32 occurs at two different locations 50, 52 along the electrode A. The different, second location 52 is the result of adjustment of the gauge member 14 after the first crimping but before the second crimping occurs. The placement of the second location 52 of crimping slightly closer to the tip end C of the electrode A than the first location 50 of crimping results in the production of a more consistent second split F of the crack D.

In conclusion, the electrode tip cracking apparatus 10 of the present invention, having the construction described above, overcomes the problems experienced heretofore with use of the hand-actuated cutters. Specifically, the apparatus 10 embodies the following operating principles and features which improve crack formation. First, rather than by "lever" action in a pair of hand cutters, travel of the dies 30, 32 in the cracking apparatus 10 is effected through the mechanical advantage inherent in the sections 34A, 34B of fine threads formed on the die thrust shaft 34. Second, control of die travel is governed by an accurate and positive die travel stop element 18, instead of kinesthetic "feel" of manually actuated cutters. Third, an adjustable electrode stop element 14A of the gauge member 14 very accurately controls the point of crack initiation (axial position of die contact with the workpiece). The hand cutters previously used had no positive control of cutting die position. Thus, cutting die positioning relied completely on the operator's visual estimation. Fourth, unlike the dies of a hand cutter, the dies 30, 32 of the cracking apparatus 10 actuate in a parallel fashion. As such, it is possible and easier to align the second die stroke more nearly at 90 degrees to the first end split. This provides for more symmetry in the resulting cruciform shape of the finished crack D. Fifth, relief pockets 48 milled in the rear wall 12B below the gauge member 14 allow small chips and pieces of broken electrode, when they occur, to clear away from the die working areas. Sixth, because the die support frame 26 of the die assembly 16 is slotted and separate from the main tool housing 12, the centerline of die action can be easily aligned with the centerline of the workpiece. Seventh, the stepped, combination righthand and lefthand threaded die thrust shaft 34 provides for equal and opposite travel of each die 30, 32 toward the workpiece with no complicated gears, pinions, racks, die shaft arrangements, springs, etc., being employed. Eighth, the electrode entry passage 22 is tapered for ease of insertion, and the restraint portion of the passage provides enough diametral clearance to enable the electrode centerline to shift slightly and conform to the crimping die action centerline. Finally, simple interfitting design of the die support frame 26 and the main tool housing 12 permits easy die replacement. There is no necessity for close tolerancing on cracking die configuration, other than suitably close fit of the dimensions of the cavity 20 defined by the main tool housing 12 with the width and thickness of the die support frame 26.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the forms hereinbefore described being merely preferred or exemplary embodiments thereof.

I claim:

1. A welding electrode tip cracking apparatus, comprising:
   (a) a main housing having a pair of spaced walls defining a cavity therebetween, one of the walls having an entry passage for receiving an elongated electrode having a tip through said one wall;
   (b) means adjustably mounted to the other wall for defining a stop spaced from and disposed in alignment with said entry passage of said one wall, said stop being engagable by an end of the electrode tip upon insertion thereof through said one wall entry passage so as to block further movement of the electrode tip toward said other wall;
   (c) means disposed within said cavity between said spaced main housing walls for defining a guide channel;
   (d) a pair of spaced crimping dies disposed within said guide channel; and
   (e) means mounted to said guide channel defining means and coupled to said spaced crimping dies for moving said dies toward and away from each other along said guide channel and thereby toward and away from the electrode, when inserted through said one wall entry passage and engaged with said stop, to crimp the electrode therebetween and, in turn, cause propagation of a split in the electrode tip from the location of the crimping to the end of the electrode tip.

2. The apparatus as recited in claim 1, wherein said guide channel defining means is a support frame fitted within said cavity between said spaced main housing walls.

3. The apparatus as recited in claim 2, wherein said die moving means is an elongated thrust shaft rotatably mounted to said support frame and coupled to said spaced cracking dies such that rotation of said shaft causes movement of said crimping dies toward and away from each other along said guide channel and thereby toward and away from the electrode.

4. The apparatus as recited in claim 3, wherein:
   said rotatable thrust shaft has righthand and lefthand externally threaded sections axially displaced from one another; and
   said crimping dies have respective righthand and lefthand internally threaded bores receiving said corresponding externally threaded sections of said shaft such that rotation of said shaft in one sense causes movement of said crimping dies away from each other, whereas rotation of said shaft in an opposite sense causes movement of said crimping dies toward one another.

5. The apparatus as recited in claim 1, further comprising:
   a travel stop element disposed between said spaced crimping dies for limiting how close said dies can be moved toward each other so as to prevent overcrimping of the electrode by said dies.

6. The apparatus as recited in claim 1, wherein said crimping dies have respective crimp edges with respective carbide pins attached thereon.

7. A Welding electrode tip cracking apparatus, comprising:
   (a) a main housing having a pair of spaced walls defining a cavity therebetween, one of said walls having an entry passage therethrough for receiving an elongated electrode having a tip through said one wall;
   (b) a gauge member adjustably mounted to the other wall and having a stop element thereon spaced from and disposed in alignment with said entry passage of said one wall, said stop element being engagable by an end of the electrode tip upon insertion thereof through said one wall entry passage so as to block further movement of the electrode tip toward said other wall; and (c) a die assembly including (i) a support frame fitted within said cavity between said spaced main housing walls and defining a guide channel, (ii) a pair of spaced crimping dies disposed within said guide channel of said support frame, and (iii) an elongated thrust shaft rotatably mounted to said support frame and coupled to said spaced crimping dies such that rotation of said shaft causes movement of said crimping dies toward and away from each other along said guide channel and thereby toward and away from the electrode, when inserted through said one wall entry passage and engaged with said gauge member stop element, for crimping the electrode therebetween which, in turn, causes propagation of a split in the electrode tip from the location of the crimping to the end of the electrode tip.

8. The apparatus as recited in claim 7, further comprising:
   a travel stop element disposed between said spaced crimping dies for limiting how close said dies can be moved toward each other so as to prevent overcrimping of the electrode by said dies.

9. The apparatus as recited in claim 7, wherein:
   said rotatable thrust shaft has righthand and lefthand externally threaded sections axially displaced from one another; and
   said crimping dies have respective righthand and lefthand internally threaded bores receiving said corresponding externally threaded sections of said shaft such that rotation of said shaft in one sense causes movement of said crimping dies away from each other, whereas rotation of said shaft in an opposite sense causes movement of said crimping dies toward one another.

10. The apparatus as recited in claim 9, wherein one of said righthand and lefthand externally threaded sections of said thrust shaft is larger in diameter than the other thereof.

11. The apparatus as recited in claim 9, wherein said gauge member is threaded into said other wall of said housing.

12. The apparatus as recited in claim 7, wherein said crimping dies have respective crimp edges with respective carbide pins attached thereon.

13. A welding electrode tip cracking apparatus, comprising:
(a) a main housing having spaced front and rear walls defining a cavity therebetween, said front wall having an entry passage therethrough for receiving an elongated electrode having a tip through said front wall;
(b) a gauge member adjustably mounted to said rear wall and having a stop element thereon spaced from and disposed in alignment with said entry passage, said stop element being engagable by an end of the electrode tip upon insertion thereof through said front wall entry passage toward said rear wall;
(c) a die assembly including (i) a support frame fitted within said cavity between said front and rear walls of said housing and defining a guide channel, (ii) a pair of upper and lower crimping dies disposed within said guide channel of said support frame, and (iii) an elongated thrust shaft rotatably mounted to said support frame and coupled to said upper and lower dies such that rotation of said shaft causes movement of said upper and lower dies toward and away from each other along said guide channel and toward and away from the electrode inserted through said front wall entry passage and engaged with said stop element; and
(d) a travel stop element disposed between said upper and lower dies for limiting how close said dies can be moved toward each other so as to prevent overcrimping of the electrode by the dies.

14. The apparatus as recited in claim 13, wherein:
said rotatable thrust shaft has righthand and lefthand externally threaded sections axially displaced from one another; and
said crimping dies have respective righthand and lefthand internally threaded bores receiving said corresponding externally threaded sections of said shaft such that rotation of said shaft in one sense causes movement of said crimping dies away from each other, whereas rotation of said shaft in an opposite sense causes movement of said crimping dies toward one another.

15. The apparatus as recited in claim 14, wherein one of said righthand and lefthand externally threaded sections of said thrust shaft is larger in diameter than the other thereof.

16. A welding electrode tip cracking method, comprising the steps of: (a) inserting a tip end of an elongated electrode between and through a first predetermined distance past a pair of spaced crimping dies; (b) moving the crimping dies toward one another and into engagement with the electrode at a first location thereon; (c) crimping the electrode between the crimping dies so as to cause propagation of a first split in the electrode tip; and (d) moving the crimping dies away from one another so as to release engagement with the electrode.

17. The method as recited in claim 16, further comprising the steps of:
(e) rotating the electrode about its longitudinal axis through an predetermined angular displacement;
(f) moving the crimping dies toward one another and into engagement with the electrode at a second location thereon angularly displaced about the electrode from the first location;
(g) crimping the electrode between the crimping dies so as to cause propagation of a second split in the electrode tip which intersects and is angularly displaced from the first split; and
(h) moving the crimping dies away from one another so as to release engagement with the electrode.

18. The method as recited in claim 17, wherein the first and second splits extend in an orthogonal intersecting relation with respect to one another and define a cruciform-shaped crack in the electrode tip where the respective origins of the splits are offset axially from one another.

19. The method as recited in claim 17, further comprising the step of:
inserting the tip end of the electrode between and through a second predetermined distance past the spaced crimping dies being different than the first predetermined distance such that crimping of the electrode and thereby originating of the splits by the dies occurs at two different locations along the electrode.

20. The method as recited in claim 19, wherein the first and second splits extend in an orthogonal intersecting relation with respect to one another and define a cruciform-shaped crack in the electrode tip where the respective origins of the splits are offset axially from one another.

* * * * *